(12) United States Patent
Dai

(10) Patent No.: US 9,887,588 B2
(45) Date of Patent: Feb. 6, 2018

(54) METHOD OF WIRELESS TRANSMISSION OF ELECTRICITY

(71) Applicant: GUANGZHOU RISING DRAGON ELECTRONICS & PLASTICS TECHNOLOGY CO., LTD., Guangzhou (CN)

(72) Inventor: Zhongguo Dai, Guangzhou (CN)

(73) Assignee: GUANGZHOU RISING DRAGON ELECTRONICS & PLASTICS TECHNOLOGY CO., LTD., Guangzhou, Guangdong (CN)

( * ) Notice: Subject to any disclaimer, the term of this patent is extended or adjusted under 35 U.S.C. 154(b) by 167 days.

(21) Appl. No.: 14/902,495

(22) PCT Filed: Jan. 30, 2015

(86) PCT No.: PCT/CN2015/071929
§ 371 (c)(1),
(2) Date: Dec. 31, 2015

(87) PCT Pub. No.: WO2016/119204
PCT Pub. Date: Aug. 4, 2016

(65) Prior Publication Data
US 2016/0372972 A1 Dec. 22, 2016

(30) Foreign Application Priority Data
Jan. 26, 2015 (CN) .......................... 2015 1 0039828

(51) Int. Cl.
*H01F 37/00* (2006.01)
*H02J 50/10* (2016.01)
(Continued)

(52) U.S. Cl.
CPC ............... *H02J 50/10* (2016.02); *H02M 7/04* (2013.01); *H05B 33/0809* (2013.01)

(58) Field of Classification Search
CPC ........ H02J 50/10; H02M 7/04; H05B 33/0809
See application file for complete search history.

(56) References Cited

U.S. PATENT DOCUMENTS

| 9,000,620 B2* | 4/2015 | Kim ........................ H02J 17/00 307/104 |
| 9,030,051 B2* | 5/2015 | Muratov ................. H02J 5/005 307/104 |
| 2013/0182461 A1 | 7/2013 | Muratov |

FOREIGN PATENT DOCUMENTS

| CN | 101924583 | 12/2010 |
| CN | 102082451 | 6/2011 |

(Continued)

OTHER PUBLICATIONS

International Search Report and Written Opinion for Application No. PCT/CN2015/071929 dated Jun. 29, 2015.

(Continued)

*Primary Examiner* — Kenneth B Wells
(74) *Attorney, Agent, or Firm* — Dorsey & Whitney LLP

(57) ABSTRACT

A method of wireless transmission of electricity is disclosed, including: inputting a first AC electricity into a transmitting terminal intermittently, and generating, by a microcontroller unit, different control signals according to the intermittently input first AC electricity; modulating the control signals and a first constant-voltage DC electricity to an electrical signal transmitted through a wire; performing a signal-electricity separation process to the electrical signal, to separate the control signals from the electrical signal; generating, by a signal generator, a near field inductive signal, and modulating the near field inductive signal and the control signals, to generate a signal to be sent; and amplifying the power of the signal to be sent, and sending, by a transmitting coil, the power-amplified signal to be sent in the form of an electromagnetic wave. The present invention can convert the DC (Continued)

electric energy into electromagnetic waves required by near field electromagnetic induction, generate different control signals according to the intermittently power supply of the transmitting terminal, and use the control signals to modulate the electromagnetic waves, so that the wireless electric power transmission and one-way control signal transmission can be achieved at the same time, and it can provide normal power supply to the load while controlling the operating mode of the load.

4 Claims, 3 Drawing Sheets

(51) Int. Cl.
*H05B 33/08* (2006.01)
*H02M 7/04* (2006.01)

(56) References Cited

FOREIGN PATENT DOCUMENTS

| | | |
|---|---|---|
| CN | 103178621 | 6/2013 |
| CN | 103368270 | 10/2013 |
| CN | 103501059 | 1/2014 |
| CN | 103595146 | 2/2014 |
| CN | 103972995 | 8/2014 |
| CN | 104158304 | 11/2014 |
| CN | 104158305 | 11/2014 |
| EP | 0829940 | 3/1998 |
| FR | 2756953 | 6/1998 |
| KR | 20130005570 | 1/2013 |

OTHER PUBLICATIONS

Search Report & First Office Action for Priority Chinese Patent Application No. 201510039828.2, dated Apr. 20, 2016.

* cited by examiner

FIG. 5

FIG. 6

Receiving, by a receiving terminal, an electromagnetic wave through a receiving coil to generate second alternating current electricity, and demodulating the received electromagnetic wave to obtain a control signal ⎯ S21

Converting the second alternating current electricity into second constant voltage direct current electricity for supplying power to a load, and controlling the operating mode of the load based on the control signal ⎯ S22

FIG. 7

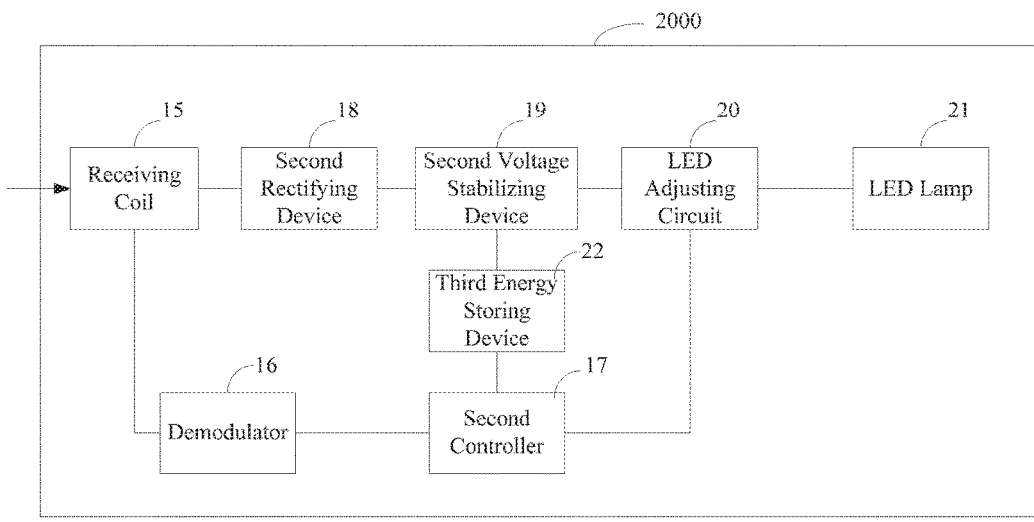

FIG. 8

METHOD OF WIRELESS TRANSMISSION OF ELECTRICITY

FIELD

The present invention relates to the field of wireless technology, and more particularly, to a method of wireless transmission of electricity.

BACKGROUND

In conventional technologies, a power supply and a load can only achieve transmission of electricity by a wire connected between the power supply and the load. With the technological development, there have been methods of wireless transmission of electricity. The existing wireless transmission of electricity technologies may typically use a transmitting coil to convert DC electric energy into electromagnetic waves required by near field electromagnetic induction, and use a receiving coil to convert electromagnetic waves into electric energy, to achieve transmission of electricity between the transmitting coil and the receiving coil with no wire connected between the transmitting coil and the receiving coil, and with no conductive contact on the outer surface of the transmitting coil and the receiving coil. The current wireless transmission of electricity technology has been already available on mobile phones, and in particular for wireless recharging such as for mobile phones. However, such wireless transmission of electricity technology only supports transmission of electric power rather than transmission of control signal, or extra coils are required to transmit a control signal, which is inconvenient.

SUMMARY

Based on this, the present invention provides a method of wireless transmission of electricity, which is able to transmit simultaneously electric power and control signals to expand the application field of the wireless transmission of electricity technology.

The present invention provides a method of wireless transmission of electricity.

A method of wireless transmission of electricity according to an aspect of the present invention includes the following steps:

inputting intermittently a first AC electricity into a transmitting terminal, and generating, by a microcontroller unit, a control signal according to the intermittently input first AC electricity;

modulating the control signal and a first constant-voltage DC electricity to an electrical signal transmitted through a wire;

performing a signal-electricity separation process to the electrical signal to separate the control signal from the electrical signal;

generating, by a signal generator, a near field inductive signal, and modulating the near field inductive signal and the control signal, to generate a signal to be sent; and amplifying the power of the signal to be sent, and sending, by a transmitting coil, the power-amplified signal to be sent in the form of an electromagnetic wave.

A method of wireless transmission of electricity according to another aspect of the present invention includes the following steps:

receiving, by a receiving terminal, an electromagnetic wave to generate a second AC electricity, and demodulating the received electromagnetic wave to obtain a control signal; and converting the second AC electricity into second constant-voltage DC electricity for supplying power to a load, and controlling the operating mode of the load based on the control signal.

The method of wireless transmission of electricity according to the present invention can convert the DC electric energy into electromagnetic waves required by near field electromagnetic induction, and convert the electromagnetic waves into electric energy through the receiving coil, to achieve the transmission of electricity between the transmitting terminal and the receiving terminal without wire connected between the transmitting terminal and the receiving terminal, while generating different control signals according to the intermittent power supply of the transmitting terminal, using the control signals to modulate the electromagnetic waves, so that the wireless electric power transmission and one-way control signal transmission can be achieved at the same time, ensuring to provide normal power supply to the load while controlling the operating mode of the load.

BRIEF DESCRIPTION OF THE DRAWINGS

FIG. 5 is a view showing a wave of a near field inductive signal generated by a signal generator 10.

FIG. 6 is a view showing a wave of a signal to be sent from a modulator 11.

FIG. 7 is a flowchart showing processing of a receiving terminal according to a second embodiment of the present invention.

FIG. 8 is a schematic diagram showing a receiving device 2000 according to the second embodiment of the present invention.

DETAILED DESCRIPTION OF THE PREFERRED EMBODIMENTS

The embodiments of the present invention will be described hereinafter with reference to the drawings.

Embodiment One

Figure 1:
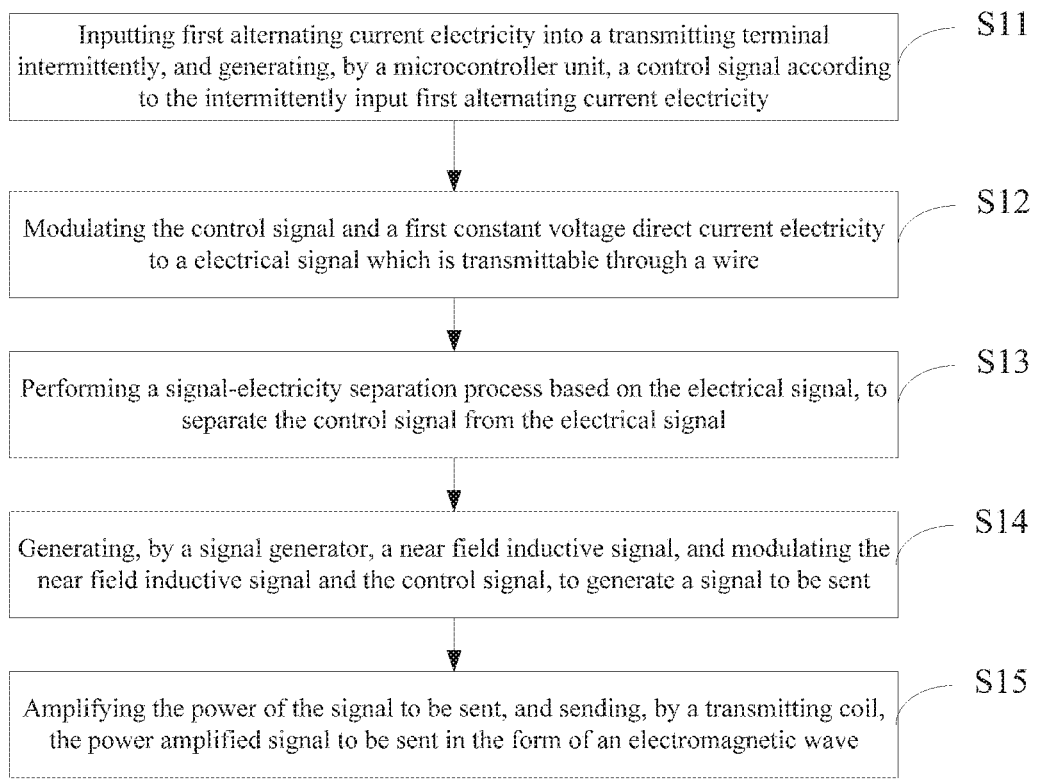
FIG. 1 is a flowchart showing processing of a transmitting terminal according to a first embodiment of the present invention.

Embodiment One illustrates processing of a transmitting terminal during a wireless transmission of electricity. FIG. 1 is a flowchart showing processing of the transmitting terminal according to the first embodiment. As shown in FIG. 1, the processing of the transmitting terminal includes the following steps:

S11, inputting intermittently a first AC electricity into a transmitting terminal, and generating, by a microcontroller unit, different control signals according to the intermittently input first AC electricity;

S12, modulating the control signals and a first constant-voltage DC electricity to an electrical signal transmitted through a wire;

S13, performing a signal-electricity separation process to the electrical signal to separate the control signals from the electrical signal;

S14, generating, by a signal generator, a near field inductive signal, and modulating the near field inductive signal and the control signals to generate a signal to be sent; and S15, amplifying the power of the signal to be sent, and sending, by a transmitting coil, the power-amplified signal to be sent in the form of an electromagnetic wave.

Specifically, the first AC electricity input into the transmitting terminal is intermittent, and the microcontroller unit can generate different control signals according to the intermittently input first AC electricity, for example, a plurality of control signals may be stored the microcontroller unit so that the microcontroller unit may choose to output a corresponding control signal whenever there is no AC input for a short time. A power supply modulating device then may modulate the control signals and first constant-voltage DC electricity to generate an electrical signal transmitted through a wire. The generated electrical signal may be transmitted to an end where the transmitting coil is. The electrical signal in the wire may be processed for signal-electricity separation to separate the control signals. The signal generator then may generate a near field inductive signal which is a high-frequency signal with a frequency under the requirement of the transmitting coil. The near field inductive signal and the control signal may be modulated to generate a signal to be sent. The power of the signal to be sent may be amplified, and the amplified signal may be sent in the form of an electromagnetic wave.

In a particular embodiment, the above first constant-voltage DC electricity may be supplied from an external constant-voltage DC source or be converted from the first AC electricity.

The processing of the transmitting terminal will be further described with a special example of a transmitting device.

Figure 2:
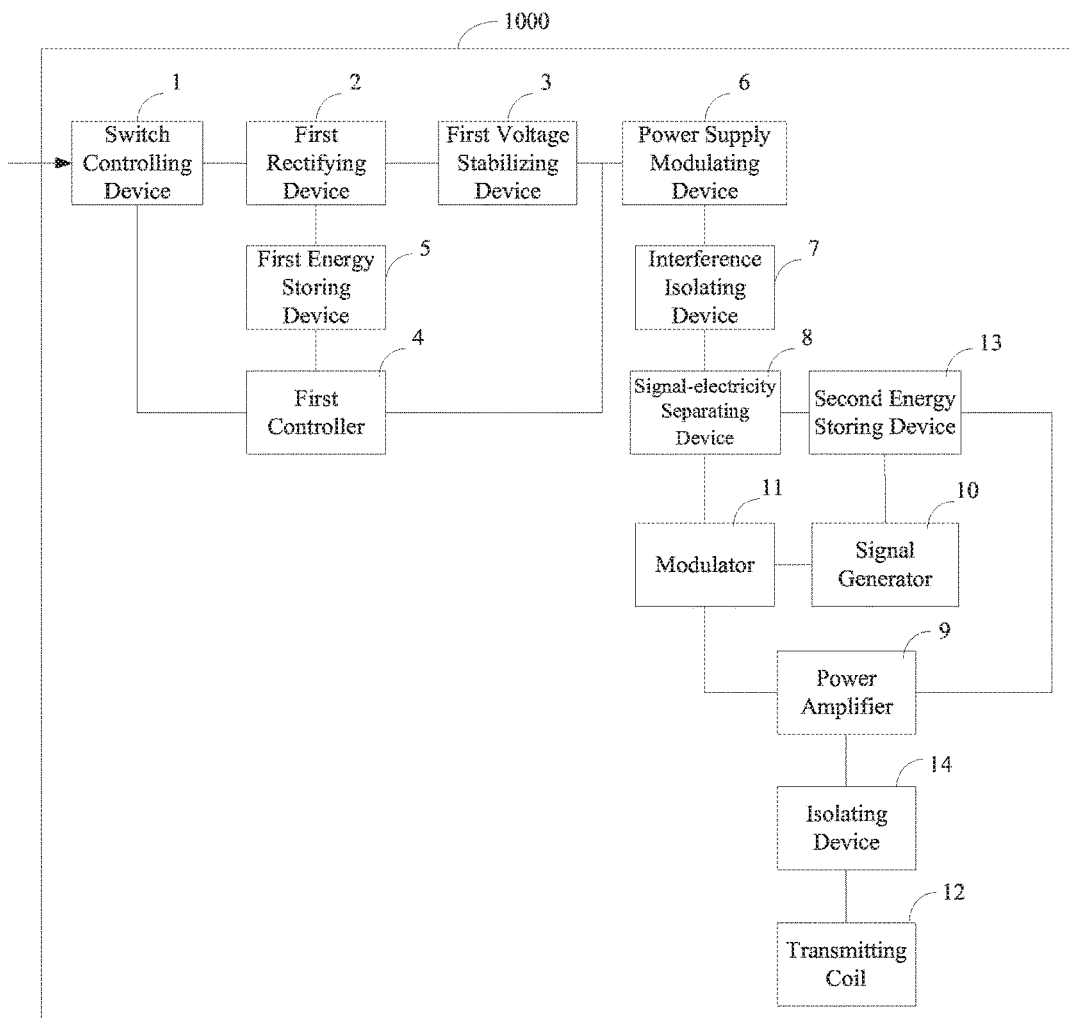
FIG. 2 is a schematic diagram showing a transmitting device 1000 according to the first embodiment of the present invention.

As shown in FIG. 2, it is a schematic diagram showing a special transmitting device according to the first embodiment. The transmitting device 1000 includes a switch controlling device 1, a first rectifying device 2, a first voltage stabilizing device 3, a microcontroller unit 4, an energy storing device 5, a supply modulating device 6, an interference isolating device 7, a signal-electricity separating device 8, a power amplifier 9, a signal generator 10, a modulator 11, a transmitting coil 12 and a second energy storing device 13.

The switch controlling device 1, the first rectifying device 2, the first voltage stabilizing device 3, the supply modulating device 6, the interference isolating device 7 and the signal-electricity separating device 8 are connected in sequence.

The output end of the switch controlling device 1 is connected to the input end of the microcontroller unit 4, and the output end of the microcontroller unit 4 is connected to the input end of the supply modulating device 6.

The input end of the modulator 11 is connected respectively to the output end of the signal-electricity separating device 8 and the output end of the signal generator 10, and the output end of the modulator 11 is connected to the input end of the power amplifier 9. The output end of the power amplifier 9 is connected to the transmitting coil 12.

The operating principle of the transmitting device 1000 is further described hereafter.

Figure 3:
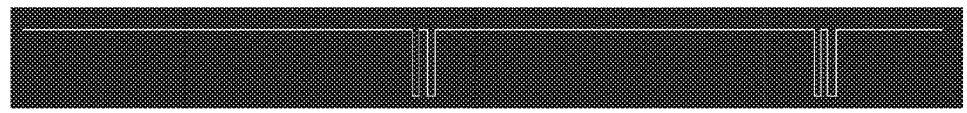
FIG. 3 is a view showing a wave of an electrical signal of modulated control signal and first constant-voltage DC electricity according to the first embodiment of the present invention.

First AC electricity may be input into the transmitting device 1000, the switch controlling device 11 may control the intermittent input of the first AC electricity, and the microcontroller unit 4 may generate different control signals according to the intermittently supplied first AC electricity. For example, when the first AC electricity is input, the microcontroller unit 4 may output a control signal a, when the switch controlling device 1 cuts off the input of the first AC electricity and continues to control the input of the first AC electricity within a short time, the microcontroller unit 4 may output a control signal b, when the switch controlling device 1 cuts off the input of the first AC electricity again and continues to control the input of the first AC electricity within a short time, the microcontroller unit 4 may output a control signal c, and so on. As the intermittent input of the first AC electricity, the microcontroller unit 4 may output different control signals. The first AC electricity may be converted into a first DC by the first rectifying device 2, and the first DC may be converted into first constant-voltage DC electricity by the first voltage stabilizing device 3. The power supply modulating device 3 may modulate the control signal and the first constant-voltage DC electricity to an electrical signal which is transmitted by a wire, FIG. 3 shows the wave of the electrical signal in a particular embodiment. Since the first AC electricity is transmitted intermittently and there is no AC input for a short time (for example, one second to five seconds), the first energy storing device 5 is provided in the first embodiment, which can be a capacity for power storage to supply working power for the microcontroller unit 4.

Preferably, before the signal-electricity separation process, an interference isolation process may be performed to the electrical signal.

Because the electrical signal generated by modulating the control signal output from the microcontroller unit 4 and the first constant-voltage DC electricity may be generally transmitted to a plurality of (for example, 2 to 60) transmitting coils, the interference isolating device 7 in the embodiment may use a method known in the prior art to perform the signal-electricity separation process for the electrical signal, to avoid interference of power supply lines between the transmitting coils. If the electrical signal is transmitted to one transmitting coil, there is no need to perform the processing of interference isolation.

Figure 4:
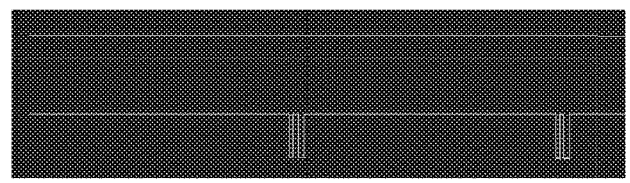
FIG. 4 is a view showing waves of the control signal and the first constant-voltage DC electricity separated by a signal-electricity separating device 8 according to the first embodiment of the present invention.

The electrical signal may be sent to the signal-electricity separating device 8 after the process of interference isolation, to separate the first constant-voltage DC electricity and the control signal. FIG. 4 shows waves of the separated first constant-voltage DC electricity and the control signal in a particular embodiment. The wave in the upper portion of FIG. 4 is a wave of the first constant-voltage DC electricity, and the wave in the lower portion of FIG. 4 is a wave of the control signal. The first constant-voltage DC electricity may supply power to the signal generator 10 and the power amplifier 9 through the second energy storing device 13. The signal generator 10 may generate a near field inductive signal with a frequency under the requirement of the transmitting coil 12. FIG. 5 is a view showing wave of a near field inductive signal. The modulator 11 may modulate the near field inductive signal and the separated control signal to generate a signal to be sent. FIG. 6 shows a wave of the modulated signal to be sent in a particular embodiment. The signal to be sent may then be sent to the transmitting coil 12 through the power amplifier 9. The transmitting coil 12 may send the power-amplified signal to be sent in the form of an electromagnetic wave.

The purpose of the above first rectifying device 2, the first voltage stabilizing device 3 and the first energy storing device 5 is to provide DC electricity. Alternatively, the first rectifying device 2, the first voltage stabilizing device 3 and the first energy storing device 5 can be replaced by a power supply unit, such as a constant-voltage DC source, and at this time, the output end of the power supply unit is connected to the input end of the power supply modulating device 6 and the power source end of the first controller 4. The power supply unit may supply working power to the first controller 4 on one hand, output the first constant-voltage DC electricity to the power supply modulating device 6 on the other hand. The power supply modulating device 6 may modulate the first constant-voltage DC electricity and the control signal to an electrical signal.

Further, after amplifying the power of the signal to be sent, and before sending the power-amplified signal by the transmitting coil 12, an interference isolation process may be performed to the power-amplified signal to be sent. The transmitting device 1000 in this embodiment thus further comprises an isolating device 14 which is connected between the power amplifier 9 and the transmitting coil 12 to prevent the high voltage generated when the power of the transmitting coil 12 being cut off from returning to break down the modulator 11. A diode may be used as the isolating device 14.

The transmitting terminal in the first embodiment can convert the DC electric energy into electromagnetic waves required by near field electromagnetic induction, generate different control signals according to the intermittently power supply of the transmitting terminal, use the control signals to modulate the electromagnetic waves, so that the wireless electric power transmission and one-way control signal transmission can be achieved at the same time, and it can ensure to provide normal power supply to the load while controlling the operating mode of the load.

Embodiment Two

This embodiment illustrates processing of a receiving terminal during a wireless transmission of electricity. FIG. 7 is a flowchart showing processing of a receiving terminal according to the second embodiment. As shown in FIG. 7, a method of wireless transmission of electricity includes the following steps:

S21, receiving, by a receiving terminal, an electromagnetic wave to generate second AC electricity and demodulating the received electromagnetic wave to obtain a control signal; and S22, converting the second AC electricity into second constant-voltage DC electricity for supplying power to a load, and controlling the operating mode of the load based on the control signal.

After receiving the electromagnetic wave by the receiving coil, because of the electromagnetic induction phenomenon, the receiving coil may generate the second AC electricity which may supply working power to the load of the receiving terminal. The control signal sent from the transmitting terminal can be obtained by demodulating the received electromagnetic wave.

The processing of the receiving terminal in the second embodiment will be further described with a special example of a receiving device. As shown in FIG. 8, and with reference to FIGS. 1-7, the receiving device in this embodiment includes a receiving coil 15, a demodulator 16, a controller 17, a second rectifying device 18, a second voltage stabilizing device 19, a load adjusting circuit 20, a load 21 and a third energy storing device 22.

The receiving coil 15, the second rectifying device 18, the second voltage stabilizing device 19 and the third energy storing device 22 are connected in sequence. The third energy storing device 22 supplies power for the controller 17.

The input end of the demodulator 16 is connected to the output end of the receiving coil 15, and the output end of the demodulator 16 is connected to the input end of the controller.

The input end of the load adjusting circuit 2 is connected to the output end of the controller and the output end of the second voltage stabilizing device 19 respectively, and the output end of the load adjusting circuit 20 is connected to the load 21.

The receiving coil 15 may generate second AC electricity after receiving the electromagnetic wave, the demodulator 16 may demodulate the received electromagnetic wave to a control signal, the controller 17 may process the control signal and send the processed result to the load adjusting circuit 20, and the load adjusting circuit 20 may adjust the operating mode of the load 21 based on the processed result from the controller 17.

The second rectifying device 18 may convert the second AC electricity into DC electricity, the second voltage stabilizing device 19 may perform a voltage stabilization process to the DC electricity to output the second constant-voltage DC electricity, and the second constant-voltage DC electricity may supply power for the load 21.

Because there may be no electromagnetic wave transmission for a short time (100-500 milliseconds) during the operation of the transmitting coil affected by the control signal at the transmitting terminal, the third energy storing device 22, such as a capacitor for power storage in the receiving device 2000, can ensure power supply to the controller 17 during the short time (100-500 milliseconds) when there is no electromagnetic wave. Assume that there is no electromagnetic wave transmission in the transmitting coil 12 when a binary signal is 0, there will be electromagnetic wave transmission in the transmitting coil 12 when the binary signal is 1. Based on this principle, the present invention can send control signals while performing the wireless transmission of electricity.

Preferably, the controller 17 can be a microcontroller; alternatively, the controller 17 can be consisted of other electronic components.

The method of wireless transmission of electricity provided in the present invention can be widely used in various applications of wireless connection. Take for example the case of a bathtub of wireless connection. At present, bathtub lamps have already appeared in bathtubs to improve user experience. The bathtub lamp is generally powered through a connected wire, and fixed in the bathtub to provide lighting and improve the interest of bathing. Because the bathtub is a household article to be filled with water when using, the bathtub lamp connected to the wire is inconvenient and unsafe, and the problem of bathtub leaking should be also considered.

In a particular embodiment, the load 21 is a LED lamp, and the operating mode of the LED lamp may include the color of the LED lamp, the luminance of the LED lamp and the changing mode of the LED lamp. The load adjusting circuit 22 is a LED adjusting circuit accordingly. The receiving coil 15 may generate a second AC electricity after receiving the electromagnetic wave, the demodulator 16 may demodulate the received electromagnetic wave to a control signal, the controller 17 may process the control signal and send the processed result to the LED adjusting circuit, and the LED adjusting circuit 20 may adjust the operating mode of the LED lamp, such as the color, luminance and changing mode of the LED lamp.

According to the method of the present invention, when the above bathtub lamp of wireless connection is used in a bathtub, the bathtub lamp is completely waterproof since there is no conductive contact on the outer surface of the bathtub; when the lamp is damaged, the lamp can be directly replaced in the bathtub without having to consider preventing water or draining off the water from the bathtub. In addition, there is no need to provide an opening on the bathtub made of a non-metallic material to install the lamp, to prevent water in the bathtub from leaking from the opening where the lamp may be installed.

On the basis of the near field induction technology in the wireless power transmission technologies, the above transmitting device 1000 can convert DC electric energy into electromagnetic waves required by near field electromagnetic induction, and the above receiving device 2000 can convert electromagnetic waves into electric energy, to achieve the conduction between the transmitting device 1000 and the receiving device 2000 with no wire connected between the transmitting device 1000 and the receiving device 2000, and the transmission of electricity between the transmitting device 1000 and the receiving device 2000 with no conductive contact on the outer surface of the transmitting device 1000 and the receiving device 2000.

Further, the present invention can generate different control signals according to the intermittently power supply of the transmitting terminal, and use the control signals to modulate the electromagnetic waves, so that the wireless electric power transmission and one-way control signal transmission can be achieved at the same time, and the operating mode of the load can be controlled. The present invention thus can be widely used in various applications of wireless connection.

The above are preferred embodiments of the present invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. A method of wireless transmission of electricity, comprising:
   inputting intermittently a first AC electricity into a transmitting terminal, and generating, by a microcontroller unit, a control signal according to the intermittently input first AC electricity;
   modulating the control signal and first constant-voltage DC electricity to an electrical signal transmitted through a wire;
   performing a signal-electricity separation process to the electrical signal to separate the control signal from the electrical signal;
   generating, by a signal generator, a near field inductive signal, and modulating the near field inductive signal and the control signal to generate a signal to be sent; and
   amplifying the power of the signal to be sent, and sending, by a transmitting coil, the power-amplified signal to be sent in the form of an electromagnetic wave.

2. The method of wireless transmission of electricity of claim 1, wherein:
   the first constant-voltage DC electricity is obtained by an external constant-voltage DC source, or by converting the first AC electricity into the first constant-voltage DC electricity.

3. The method of wireless transmission of electricity of claim 1, further comprising, before performing the signal-electricity separation process for the electrical signal, the step of:
   performing an interference isolation process to the electrical signal.

4. The method of wireless transmission of electricity of claim 1, further comprising, after amplifying the power of the signal to be sent, and before sending the power-amplified signal by the transmitting coil, the step of:
   performing an interference isolation process to the power-amplified signal to be sent.

* * * * *